United States Patent [19]
Ohmi et al.

[11] Patent Number: 5,160,429
[45] Date of Patent: Nov. 3, 1992

[54] PIPING SYSTEM FOR SUPPLYING ULTRA-PURE WATER

[75] Inventors: Tadahiro Ohmi, 1-17-301, Komegabukuro 2-chome, Aoba-ku, Sendai-shi, Miyagi-ken 980; Michiya Kawakami; Tadashi Shibata, both of Sendai; Masaru Umeda, Tokyo, all of Japan

[73] Assignee: Tadahiro Ohmi, Miyagi, Japan

[21] Appl. No.: 635,590

[22] PCT Filed: Jun. 29, 1989

[86] PCT No.: PCT/JP90/00648
§ 371 Date: Dec. 31, 1990
§ 102(e) Date: Dec. 31, 1990

[87] PCT Pub. No.: WO90/00155
PCT Pub. Date: Jan. 11, 1990

[30] Foreign Application Priority Data

Jun. 29, 1988 [JP] Japan .................. 63-162013

[51] Int. Cl.$^5$ ............... B01D 61/22; B01D 61/00
[52] U.S. Cl. ...................... 210/137; 210/98; 210/195.2; 210/196; 210/295; 210/416.1; 210/418; 210/900
[58] Field of Search ............ 210/98, 137, 195.2, 210/196, 295, 321.6, 416.1, 418, 900, 97, 194

[56] References Cited

U.S. PATENT DOCUMENTS 4,595,498 6/1986 Cohen et al. .................. 210/195.2
4,734,201 3/1988 Watanabe .................. 210/900

FOREIGN PATENT DOCUMENTS 60-129103 7/1985 Japan .................. 210/900
61-220788 10/1986 Japan .................. 210/900
64-38185 2/1989 Japan .................. 210/900
64-38186 2/1989 Japan .................. 210/900

Primary Examiner—Mary Lynn Theisen
Assistant Examiner—Sun Uk Kim
Attorney, Agent, or Firm—Baker & Daniels

[57] ABSTRACT

The present invention offers a piping system for supplying ultra-pure water, which comprises a circulation tank to store primary pure water from a primary pure water producing unit, a pump for sending the primary pure water from said circulation tank, an outward pipe, one end of which is connected to a final purifying unit to purify primary pure water from said pump to ultra-pure water, a plurality of connection pipes, each end of which is connected to the other end of said outward pipe, a branching pipe connected between the middle of said connection pipe and the ultra-pure water using unit and having a branching valve to adjust the water quantity, and a return pipe connected between the other end of said connection pipe and said circulation tank, characterized in that means for controlling the output of said pump is provided to keep the water pressure at constant level by detecting the water pressure in said outward pipe, thereby supplying a constant quantity of ultra-pure water to the ultra-pure water using unit at all times, and that ultra-pure water of ultra-high purity can be stably supplied by preventing counterflow from the return pipe to the ultra-pure water using unit.

11 Claims, 2 Drawing Sheets

PIPING SYSTEM FOR SUPPLYING ULTRA-PURE WATER

BACKGROUND OF THE INVENTION

The present invention relates to a piping system for supplying ultra-pure water to be used in large quantity in electronic industry such as semiconductor industry, or in biochemical and pharmaceutical industry.

In the past, a system as shown in FIG. 3 has been known as a piping system for supplying ultra-pure water for electronics industry, especially in the application for the manufacture of semiconductor integrated circuits.

According to such system, the primary pure water produced by a primary ultra-pure water producing system (not shown) is supplied to a circulation tank 102 through a primary pure water supply pipe 101. The primary water stored in the circulation tank 102 is pressurized by a pressure pump 103 and is purified through ultraviolet sterilizing unit (hereinafter referred as "UV sterilizing unit") 104, cartridge polishers 105, 106 and 107 and ultrafilter units 108 and 109. 122 represents a drain pipe for ultrafilter unit. The ultra-pure water thus purified is supplied to each of the user points 119, 120 and 121 through an outward pipe, connection pipes 113, 114 and 115 and branching valves 116, 117 and 118. After passing through connection pipes 113, 114 and 115, the ultra-pure water flows through a circulation route to return to the circulation tank 102 through a return pipe 112. The connection pipes 113, 114 and 115 are composed of upstream pipe sections 113-1, 114-1 and 115-1 and downstream pipe sections 113-2, 114-2 and 115-2.

FIG. 4 shows a piping system for supplying ultra-pure water of FIG. 3. 201 represents the entire ultra-pure water producing system. 131, 132 and 133 show the branching points of the connection pipes 113, 114 and 115 to the user points. The branching valves 116, 117 and 118 are integrally composed of the branching points 131, 132 and 133 respectively.

The ultra-pure water produced by such ultra-water producing unit is often supplied to the ultra-pure water using unit (hereinafter called as "user point", meaning the place where ultra-pure water is used). In a normal system, the number of the user points is extremely many, while FIG. 3 shows an example where 3 user points are provided.

However, in such piping system of conventional type, the quantity of ultra-pure water flowing in the outward pipe 110 is decreased when the number of the user points is increased, i.e. when the number of branching points is increased. On the contrary, the quantity of water in the return pipe 112 is increased when the number of the branching points is increased. Because the condition to use ultra-pure water at each user point is not constant, it has been difficult in the past to maintain the pressure between the outward pipe 110 and return pipe 112 of each of the connection pipes 113, 114 and 115 at constant level, and it has been impossible to supply a constant quantity of ultra-pure water to each of the user points at all times.

Also, in a conventional type piping system, the connection pipes 113, 114 and 115 have the same inner diameter upstream and downstream of the branching points. The branching valves 116, 117 and 118 are designed in such manner that, when they are opened, the pressure at the branching points 131, 132 and 133 is approximately equal to the atmospheric pressure. For example, in case the branching valve 117 is opened when ultra-pure water is used in the ultra-pure water using unit 120, the pressure at the branching point 132 is approximately equal to the atmospheric pressure.

On the other hand, the pressure of ultra-pure water flowing in the outward pipe 110 and the return pipe 112 is adjusted to the valve higher by 1-2 kg/cm² than the atmospheric pressure in normal case. As the result, there occurs in the connection pipes 113, 114 and 115 the flow going from the outward pipe 110 to the branching point 132 and the flow going from the return pipe 112 to the branching point 132, and these flows are mixed and supplied to the ultra-pure water using unit. The ultra-pure water flowing from the return pipe 112 to the branching pipe 132 is the ultra-pure water, which has passed through the other connection pipes 113 and 115 and the return pipe 112. Thus, it contains more impurities than the ultra-pure water, which has flown through only the upstream pipe section 114-1 of the connection pipe from the outward pipe 110 because of the elution of impurities from piping materials.

For example, when water quality is expressed by electric resistivity, which is an index of the concentration of ionic impurities contained in ultra-pure water, the resistivity of ultra-pure water supplied to the ultra-pure using unit 120 through only the upstream pipe section 114-1 of the connection pipe from the outward pipe 110 is 18.2 MΩ.cm. In contrast, the resistivity of the water to be supplied to the ultra-pure water using unit 120 through the downstream pipe section 114-2 of connection pipe from the return pipe is 18.0 MΩ.cm. This difference in resistivity 0.2 MΩ.cm corresponds to the difference of concentration of about 0.2 ppb. In other words, there is a limitation in supplying ultra-pure water with ultra-purity in the conventional type piping system for supplying ultra-pure water.

The object of the present invention is to offer a piping system, which can supply a constant quantity of ultra-pure water to each of the user points at all times and can provide stable supply of ultra-pure water with ultra-high putity by preventing the counterflow from the return pipe to the ultra-pure water using unit.

The invention comprises a circulation tank to store primary pure water from a primary pure water producing unit, a pump for sending the primary pure water from said circulation tank, an outward pipe, one end of which is connected to a final purifying unit to purify primary pure water from said pump to ultra-pure water, a plurality of connection pipes, each end of which is connected to the other end of said outward pipe, a branching pipe connected between the middle of said connection pipe and the ultra-pure water using unit and having a branching valve to adjust the water quantity, and a return pipe connected between the other end of said connection pipe and said circulation tank, characterized in that means for controlling the output of said pump is provided to keep the water pressure at constant level by detecting the water pressure in said outward pipe.

The invention describes a piping system wherein the energy loss when water is passed upstream of the branching pipe of said connection pipe is equal to the energy loss when water is passed downstream of said branching pipe.

The invention describes a piping system wherein said connection pipe has larger pipe diameter upstream than downstream.

The invention describes a piping system wherein said branching valve can limit the flow rate so that the pressure upstream is higher than the pressure downstream.

The invention describes a piping system wherein there are two or more combinations of said outward pipe and return pipe between said final purifying unit and the ultra-pure water using unit.

The invention describes a piping system for supplying ultra-pure water wherein said connection pipe is contained partially or totally in said ultra-pure water using unit.

The invention is a piping system wherein a plurality of said branching pipes are furnished on said connection pipe.

The invention offers a piping system wherein the pipe diameter of said connection pipe is gradually reduced according to the arrangement order of said branching pipe arranged from said outward pipe to said return pipe.

The invention offers a piping system wherein said branching valve is furnished at the branching portion between said connection pipe and said outward pipe and at the connection between said connection pipe and said return pipe.

The invention offers a piping system for supplying ultra-pure water wherein said outward pipe, said return pipe and said connection pipe are made of high purity vinyl chloride resin, vinylidene fluoride resin or polyether-ether ketone.

The invention is a piping system wherein said outward pipe, said return pipe and said connection pipe are made of stainless steel having inner surface, on which passive state film made primarily of $CR_2O_3$ is formed.

The pressure of water flow from pump is controlled by control means, and the pressure in the outward pipe and the return pipe is maintained at constant level. The energy loss when water passes through each of the connection pipes is equal to each other, and a constant quantity of ultra-pure water can be supplied to each user point through connection pipes.

The purity of ultra-pure water can be extensively improved when high purity vinyl chloride resin, vinylidene fluoride, vinylidene fluoride resin or polyether-ether ketone are selected as piping material and counterflow is prevented by setting the pipe diameter in upstream of the branching of connection pipe larger than that of upstream.

DETAILED DESCRIPTION OF THE PREFERRED EMBODIMENT

Figure 1:
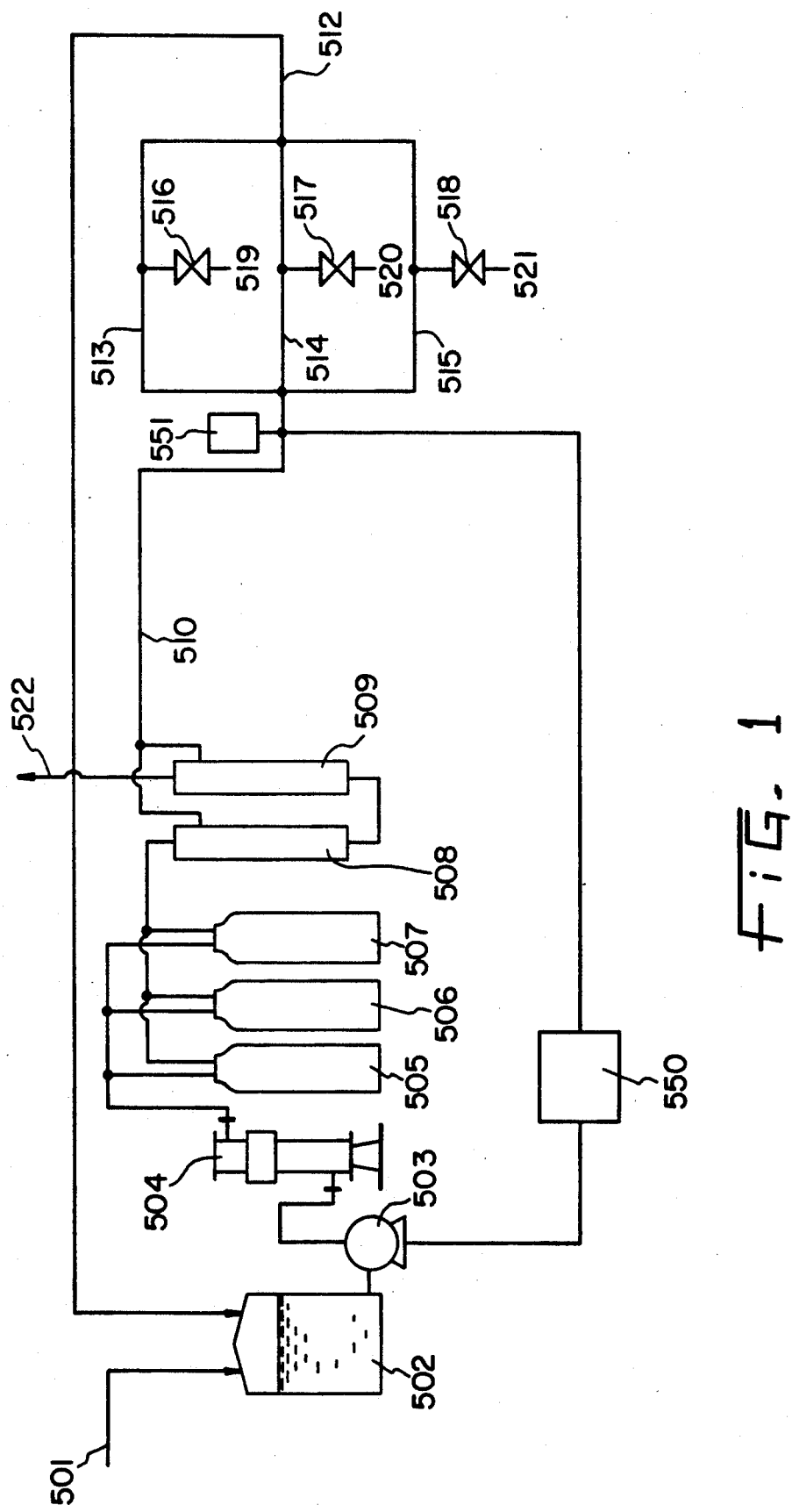
FIG. 1 is a schematical drawing of an embodiment of the invention.

An embodiment of the present invention is given in FIG. 1.

In this figure, 501 represents a primary pure water supply pipe, and the primary pure water is supplied from a primary pure water producing unit (not shown) to a circulation tank 502 through a primary pure water supply pipe 501. The primary pure water stored in the circulation tank 502 is pressurized by a pressure-feeding pump 503 and is purified as it passes through UV sterilizing unit 504, cartridge polishers 505, 506 and 507 as well as ultrafilter units 508 and 509. 522 is a drain pipe for ultrafilter unit. The ultra-pure water thus purified is supplied to the outward pipe 510 and is sent to the user points 519, 520 and 521 through connection pipes 513, 514 and 515 and the branching valves with controllable flow rate 516, 517 and 518. The present embodiment shows an example having 3 user points.

550 is a control unit for pump output, and the output of the pump 503 is controlled in such manner that the water pressure measures at the pressure sensor 551 is kept at contant level. The ultra-pure water passing through the connection pipes 513, 514 and 515 joins into the return pipe 512 and flows through the circulation route, returning to the circulation tank 502.

The pipe diameter of the connection pipes 513, 514 and 515 downstream of the branching valves 516, 517 and 518 is smaller than that of the pipes upstream.

The output of the pressure pump 503 is controlled so that sufficient quantity of water is supplied to the outward pipe 510 when water flows in each of the connection pipes 513, 514 and 515 at flow rate of 0.5 m²/h, for example.

When branching valves 516, 517 and 518 are opened in a piping system for supplying ultra-pure water with such arrangement, the resistivity of ultra-pure water supplied to the user points 519, 520 and 521 is equal to the resistivity of ultra-pure water supplied to the outward pipe 510. Namely,

| | |
|---|---|
| Resistivity: | 18.25 0.005M Ω.cm |
| Silica: | 1-2 ppb |
| TOC(total organic carbon): | 4-5 ppb |
| Total evaporation residue: | 1-2 ppb |
| Particles: | 0.3 pcs. or less/cc (>0.1 μm) |
| Bacteria: | 0/liter |

As described above, ultra-pure water having ultra-high purity can be stably supplied to user points in the present embodiment. (Methods to calculate flow rate and pressure loss)

In the following, description is given on:

(1) Method to calculate pressure loss between inlet and outlet of pipe when water quantity flowing in the pipe, pipe diameter and pipe length and physical properties of water are known; (2) Method to calculate water quantity flowing in the pipe when pressure loss between inlet and outlet of the pipe, pipe diameter and pipe length, and physical properties of water are known. The following equations (1), (2) and (3) are the equations to obtain pressure loss, and (4) and (5) the equations to obtain flow rate:

(1) Method to obtain pressure loss when fluid flows in a pipe $$\Delta P = 4 f (\rho u^2/2 g_c) (l/D) \quad (1)$$
$$f = 0.0785/\{0.7 - 1.65 \log R_e + (\log R_e)^2\} \quad (2)$$
$$R_e = D u \rho / \mu \quad (3)$$

(2) Method to obtain flow rate from pressure loss $$R_e f^{\frac{1}{2}} = 2.22 \, (\rho D^3 \cdot \Delta P/(l\mu^2))^{\frac{1}{2}} \quad (4)$$

Here, $R_e$ can be obtained from the relation diagram between $R_e f^{\frac{1}{2}}$ and f.

$$Q = R_e \eta D \pi / r \rho \quad (5)$$

where
P: Pressure loss [kg/cm$^2$]
Q: Flow rate [m$^3$/s]
f: Reistance coefficient
$R_e$: Reynolds number
$\rho$: Density [kg/m$^3$]
D: Pipe diameter [m]
u: Flow velocity [m/s]
l: Pipe length [m]
$g_c$: Gravitational conversion factor [kg.m/kg.s$^2$]
$\mu$: Viscosity [kg/mos]

CALCULATION EXAMPLE

Figure 2:
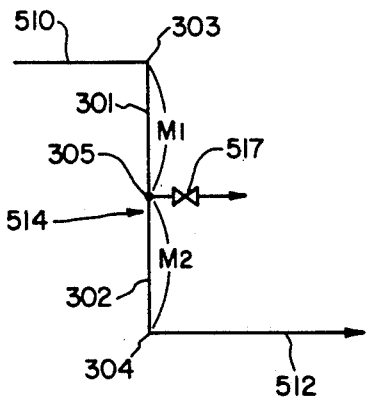
FIG. 2 schematically illustrates a portion near connection pipe.
Figure 3:
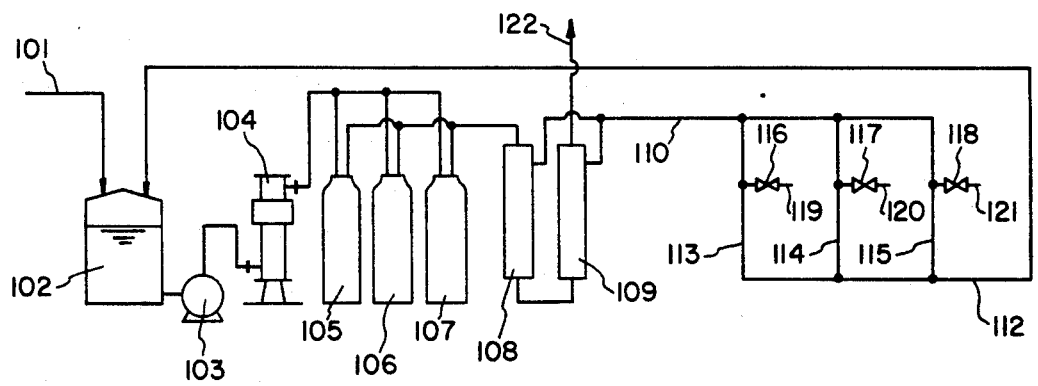
FIG. 3 is a schematical drawing of a conventional type piping system for supplying ultra-pure water.
Figure 4:
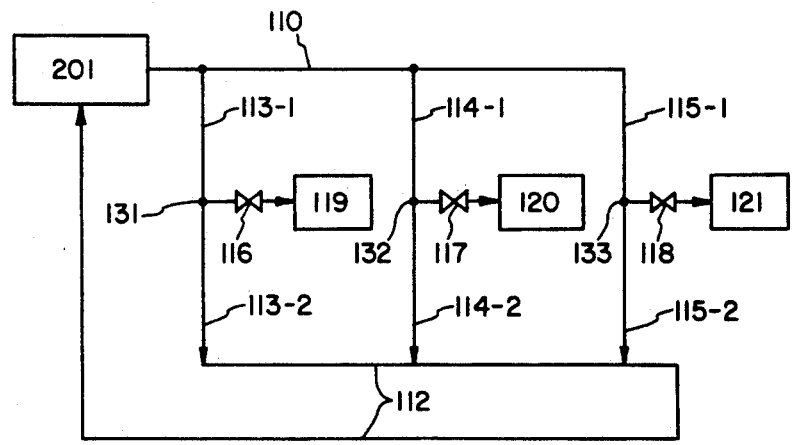
FIG. 4 shows a part of a piping system for supplying ultra-pure water of FIG. 3.

FIG. 2 shows a part of a piping system to explain the calculation example. 301 represents a pipe section upstream of connection pipe 514, and 302 a downstream pipe section of the connection pipe. 303 denotes a branching point of the outward pipe 510 and the connection pipe 514, 304 a confluence point of the connection pipe and the return pipe, 305 a branching point from the connection pipe 514 to the branching valve 517.

Here, it is supposed that the length $M_1$ of upstream pipe section 301 of the connection pipe 514 and that of the downstream pipe section 301 $M_2$ are 2 m respectively and that inner diameter of upstream pipe section is 20 mm, and the flow rate and the pressure loss in the pipe are calculated when inner diameter of pipe of downstream pipe section 302 is changed. To simplify calculation, the pressure loss is considered only in the case where connection pipe 514 is installed at horizontal position and it is straight.

The calculation procedure is as follows: When pipe diameter is given and branching valve 517 is closed, the water quantity flowing in the connection pipe 514 is estimated. This is supposed to be $q_1$. Here, the pressure loss between the branching point 303 and the confluence point 304 can be calculated by the equations (1) and (2). This value is supposed as $\Delta P_1$.

Next, description is given to the case where ultra-pure water is supplied to user points with branching valve 517 opened. In this case, however, it is supposed that the pressure loss between branching point 303 and the confluence point 304 is maintained at the pressure loss of $\Delta P_1$. When branching valve 517 is gradually opened and the flow rate of water joining through the valve 517 is increased, the water quantity flowing in upstream pipe section 301 of connection pipe 514 increases, while the water quantity flowing in downstream pipe section 302 decreases. Thus, the pressure loss generated in the upstream pipe section 301 increases, while the pressure loss generated in the downstream pipe section decreases. However, because the sum of these two pressure losses is equal to $\Delta P_1$ as obtained above, the pressure loss generated in the upstream pipe section 301 becomes ultimately equal to $\Delta P_1$ when flow rate of branch flow increases, and pressure loss is no longer generated in the downstream pipe section 302. In other words, water does not flow in the downstream pipe section 302. Ultra-pure water flowing into the connection pipe 514 from the outward pipe 510 totally flows to user points, and ultra-pure water does not flow into the return pipe 512. Here, the flow rate of branch flow to give such condition is regarded as maximum branch flow rate. Because the pressure loss at the upstream pipe section 301 is equal to $\Delta P_1$, the maximum branch flow rate can be calculated by the equations (4) and (5).

If the flow rate of branch flow is larger than maximum branch flow rate, the pressure loss generated at the downstream pipe section 302 is turned to negative, and the flow going from the confluence point 304 to the branching point 305 is generated, i.e. counterflow occurs.

In a ultra-pure water piping system, it is necessary to maintain the minimum flow velocity of 0.3 m/s in order to prevent the proliferation of microorganisms. The optimal branch flow rate, at which the flow velocity inside the downstream pipe section 302 is 0.3 m/s, can be obtained as follows: The pressure loss generated in the connection pipe 304 can be calculated from the flow velocity of 0.3 m/s. Because the difference $\Delta P_1$ is pressure loss generated at upstream pipe section 301, the flow rate flowing in the upstream pipe section 301 can be calculated. The difference between water quantity flowing in the upstream pipe section 301 and the water quantity flowing in the downstream pipe section 302 is the optimal branch flow rate.

Table 1 summarizes the results of the calculation, by which maximum branch flow rate and optimal branch flow rate are obtained on various combinations of pipe diameters. The flow velocity at upstream and downstream of the branching point of connection pipe under various conditions are also shown in Table 1.

TABLE 1

| | Upstream | | | | | | | | |
|---|---|---|---|---|---|---|---|---|---|
| | 20 | | | 20 | | | 20 | | |
| | Downstream | | | | | | | | |
| Connecton pipe dia [mm$\phi$] | 20 | | | 15 | | | 10 | | |
| Flow rate when not branched off $q_1$ [m$^3$/h] | 1 | 0.5 | 0.3 | 1 | 0.5 | 0.3 | 1 | 0.5 | 0.3 |
| Upstream flow velocity [m/s] | 0.88 | 0.44 | 0.27 | 0.88 | 0.44 | 0.27 | 0.88 | 0.44 | 0.27 |
| downstream flow velocity [m/s] | 0.88 | 0.44 | 0.27 | 1.57 | 0.78 | 0.47 | 3.54 | 1.77 | 1.06 |
| Pressure loss $P_1$ [kg/cm$^2$] | 0.021 | 0.0064 | 0.003 | 0.52 | 0.016 | 0.0065 | 0.299 | 0.089 | 0.036 |
| Maximum branch flow rate [m$^3$/h] | 1.4 | 0.79 | 0.45 | 2.6 | 1.24 | 0.79 | 6.7 | 3.4 | 2.0 |
| Upstream flow velocity [m/s] | 1.25 | 0.70 | 0.40 | 2.3 | 1.1 | 0.70 | 5.9 | 3.0 | 1.8 |
| downstream flow velocity [m/s] | 0 | 0 | 0 | 0 | 0 | 0 | 0 | 0 | 0 |
| Optimal branch flow rate [m$^3$/h] | 0.86 | 0.34 | — | 2.18 | 0.94 | 0.40 | 6.47 | 3.08 | 1.78 |
| Upstream flow velocity [m/s] | 1.20 | 0.55 | — | 2.10 | 1.00 | 0.52 | 5.80 | 2.80 | 1.65 |
| downstream flow velocity [m/s] | 0.3 | 0.3 | — | 0.3 | 0.3 | 0.3 | 0.3 | 0.3 | 0.3 |

From the calculation example of Table 1, it can be understood that optimal branch flow rate is not very high compared with water quantity flowing in connection pipe 514 when not branched off in case the pipe diameters upstream and downstream of the branching point 305 of connection pipe 514 are equal to each other, and that optimal branch flow rate may not be obtainable if the flow rate is low when not branched off. On the contrary, in case pipe diameter of the pipe upstream of the branching point of connection pipe 514 is smaller than that of downstream, optimal branch flow rate can be adopted even when flow rate in connection pipe is low in case not branched off, and counterflow from the return pipe is very unlikely to occur.

Therefore, when pipe diameters of upstream pipe section 301 and downstream pipe section 302 of connection pipe are changed, the smaller the pipe diameter of downstream pipe section 302 is compared with that of upstream pipe section 301, the easier the flow velocity can be maintained at 0.3 m/s in the downstream pipe section 302. Thus, more water can be supplied to the ultra-pure water using unit.

By sacrificing the uniformity of water quantity flowing in a plurality of connection pipes, the same effect as above can be obtained by providing a flow regulating valve near the confluence point with the return pipe 512 of the connection pipe 514. It cannot be guaranteed that minimum flow velocity is maintained at all portions, but the same effect can be obtained by furnishing a portion with smaller pipe diameter on a part of downstream pipe section of connection pipe.

Further, to obtain the above effect, the flow rate to be branched off through branching valve is controlled. In a valve of such type that the pressure at the branching point 305 becomes closer to the atmospheric pressure when branching valve 517 is opened in FIG. 2, excessive flow is branched off, and minimum flow velocity cannot be maintained in the downstream pipe section 302. In such case, a valve to control maximum flow rate is used as the branching valve 517. As the example of such valve, there are diaphragm valve having the opening freely adjustable on the branch flow side, or a 3-way valve having smaller pipe diameter on branch flow side.

How to Design the Piping System

It is supposed that the flow rate branching off to the ultra-pure water using unit through the branching valve 517 is $q_u$ (m³/s). Here, $q_u$ is determined by the specification of the ultra-pure water using unit. When it is assumed that pipe diameter of connection pipe 514 is $d_{u1}$ (m), that pipe diameter of downstream pipe section 302 is $d_{u2}$ (m), that the average flow velocity in the upstream pipe section 301 when water is not branched off through the branching valve 517 is $v_{u1}$ (m/s), and that average flow velocity in the downstream pipe section 302 is $V_{u2}$ (m/s), the following relation exists because the flow rate in the connection pipe 514 is constant:

$$\pi(d_{u1}/2)^2 \times V_{u1} = \pi(d_{u2}/2)^2 \times V_{u2} \qquad (6)$$

If it is supposed that average flow velocity flowing in the upstream pipe section 301 is $V'_{u1}$ when water quantity $q_u$ (m³/s) is branched off from the branching point 305, while average flow velocity of 0.3 m/s is maintained in the downstream pipe section 302, the following relation is obtained:

$$\pi(d_{u1}/2)^2 \times V'_{u1} = q_u + \pi(d_{u2}/2)^2 \times 0.3 \qquad (7)$$

The left side member of the equation (7) represents the water quantity flowing into the connection pipe 514 from the outward pipe 510 when ultra-pure water is used at the user point. Specifically, the left side member of the equation (6) shows the minimum value of the water quantity flowing into the connection pipe 514 from the outward pipe 510, and the left side member of the equation (7) indicates the maximum value.

When ultra-pure water is used, the water quantity flowing into the connection pipe 514 must be more than the water quantity to be used $q_u$. If this multiplication factor is supposed to be P:

$$\pi(d_{u1}/2)^2 \times V'_{u1} = q_u + \pi(d_{u2}/2)^2 \times 0.3 = P \times q_u \qquad (8)$$

Therefore, $d_{u2}$ can be obtained as follows:

$$d_{u2} = 2\{(P-1)\, q_u/0.3\pi\}^{\frac{1}{2}} \qquad (9)$$

When this is substituted in the equation (6), $$\pi(d_{u1}/2)^2 \times V_{u1} = \{(P-1)q_u/0.3\} \times V_{u2} \qquad (10)$$

From the equations (8) and (10), $$\begin{aligned} V'_{u1}/V_{u1} &= (P \cdot q_u)/\{(P-1)q_u \times V_{u2}/0.3\} \\ &= \{P/(P-1)\} \cdot (0.3/V_{u2}) \end{aligned} \qquad (11)$$

The equation (11) shows the ratio of flow velocity change in the upstream pipe section 301 of the connection pipe 514 between the case where ultra-pure water is branched off and used and the case where it is not used. If this value is high, it means that the change of water quantity flowing in the connection pipe 514 is high. If this change occurs suddenly, it leads to the so-called water hammer phenomenon. The pipe is vibrated and it may be damaged. In a process to produce ultra-fine pattern such as semiconductor integrated circuit, it is necessary to avoid the vibration as practical as possible. Accordingly, it is desirable in a manufacturing process of semiconductor integrated circuit that the value of the equation (11) is 2 or less, or 3 or less at maximum. Thus, the following relation must exist:

$$V'_{u1}/V_{u1} = \{P/(P-1)\} \cdot (0.3/V_{u2}) < 3 \qquad (12)$$

The same applies to the case of the downstream pipe section 302, and the following relation exists:

$$V_{u2}/0.3 < 3 \qquad (13)$$

From the equation (13), $$V_{u2} < 0.9 \; [\text{m/s}] \qquad (14)$$

If this is substituted in the above equation (12), $P/(P-1) < 9$

Therefore, $P > 1.125$.

For example, when 1.2 is selected as the value of P, from the above equation (8), $$\pi(d_{u1}/2)^2 \times V'_{u1} = 1.2 q_u \qquad (15)$$

$$\pi(d_{u2}/2)^2 \times 0.3 = 0.2 q_u \qquad (16)$$

Accordingly, the above equation (12) is turned to:

$$V'_{u1}/V_{u1} = (1.2/0.2) \cdot (0.3/V_{u2}) < 3$$

and $$V_{u2} > 0.6 \,[m/s]$$

If the equation (14) is taken into account, $$0.6 < V_{u2} < 0.9 \,[m/s] \tag{17}$$

and $$2 < V'_{u1}/V_{u1} < 3 \tag{18}$$

Specifically, when $V_{u1}$, $V'_{u1}$ and $V_{u2}$ satisfy the equations (17) and (18), even when the flow rate changes suddenly in case ultra-pure water is used and in case it is not used, the flow rate in the connection pipe changes mildly, and the degree of water hammer can be reduced.

Accordingly, the piping system should be designed in such manner that the flow velocity in the connection pipe satisfies the relation of the equation (17) and (18). The values of $d_{u1}$, $d_{u2}$, $V_{u1}$ and $V'_{u1}$ are determined by the equations (15), (16) and (18) in relation to the using quantity $q_u$.

On the other hand, if it is supposed that the total number of connection pipes in n, of which the number of pipes in use is m, the quantity of ultra-pure water Q ($m^3/s$) to be supplied to the outward pipe 510 is:

$$Q = m \times \pi(d_{u1}/2)^2 V'_{u1} + (n - m) \times \pi(d_{u1}/2)^2 V_{u1} \tag{19}$$

Next, description is given to the designing of a piping system for supplying ultra-pure water to 10 units, where the quantity of the ultra-pure water to be used is 0.5 $m^3/h$. The length of the connection pipe 514 depends upon the position of the ultra-pure water using unit and is not constant, while it is possible to maintain the energy loss at constant level by furnishing pipe with different pipe diameter in the connection pipes.

It is assumed that the length ($l_1$) of upstream pipe section of connection pipe is 100 m, that of downstream pipe section ($l_2$) is 100 m, and the value of simultaneous operating ratio is 0.5. In the following, description is given according to the calculation procedure of (1)-(6).

(1) To determine pipe diameter of connection pipe

If it is supposed that water quantity of 0.5 $m^3/h \times 0.2$ is passed while maintaining flow velocity of 0.3 m/s in the downstream pipe section when the quantity of water used in the ultra-pure water using unit is 0.5 $m^3/h$, and that pipe diameter of downstream pipe section is $d_{u2}$ (m), then the following relation exists from the equation (16):

$$0.3 \times \pi(d_{u2}/2)^2 = 0.1/3600 \,[m^3/s]$$

Therefore, $$d_{u2} = 0.0109 \,[m]$$
$$= 1.09 \,[cm]$$

The pipe having such dimension may be used, but there are usually the standards for pipe dimension. Accordingly, 13 mm is chosen as the value of inner diameter closer to the above value from the pipe standards. Then, the water quantity flowing when in use is 0.14 $m^3/h$. The water quantity flowing from the outward pipe to the connection pipe is:

$$0.5 + 0.14 = 0.64 \,[m^3/h]$$

If it is assumed that the flow velocity upstream of the branching point of connection pipe is 1 m/s and pipe diameter is $d_{u1}$, $$1 \div \pi(d_{u1}/2)^2 = 0.64/3600 \,[m^3/h]$$

Therefore, $$d_{u1} = 0.015 \,[m]$$
$$= 1.5 \,[cm]$$

(2) To obtain pressure difference between outward pipe and return pipe

When the water is flowing at the above flow rate, the pressure loss generated in the connection pipe is obtained from the equations (1), (2) and (3) as follows:

In the upstream pipe section:

$$\Delta P_1 = 0.945 \,kg/cm^2$$

In the downstream pipe section, $$\Delta P_2 = 0.145 \,kg/cm^2$$

Thus, the sum of two pressure losses is:

$$\Delta P = 1.090 \,kg/cm^2$$

(3) To confirm the flow velocity when ultra-pure water is not used

It is supposed that:

$$\Delta P = 1.090 \,kg/cm^2$$
$$d_1 = 0.015 \,m$$
$$d_2 = 0.013 \,m$$
$$l_1 = 100 \,m$$
$$l_2 = 100 \,m$$

and it is confirmed whether or not the flow velocity ($V_1$) on the upstream pipe section is 0.3 m/s or more.

If $V_1 = 0.3 \,[m/s]$, the flow velocity ($V_2$) of downstream pipe section is:

$$V_2 = 0.3 \times (0.015/0.013)^2$$
$$= 0.399 \,[m/s]$$

When the sum of pressure losses in these two pipe sections is lower than the value of pressure difference $\Delta P$, i.e. 1.090 $kg/cm^2$, it is regarded that minimum flow velocity is maintained. Thus, calculation can be made using the equations (1), (2) and (3) as:

$$\Delta P' = \Delta P_1 + \Delta P_2$$
$$= 0.120 + 0.234$$
$$= 0.354 \,[kg/cm^2]$$

This value is sufficiently lower than the above pressure loss, and it is judged that the flow velocity on upstream pipe section is 0.3 m/s or more.

On the other hand, by the numerical calculation using the equations (1), (2) and (3), the water quantity flowing in the connection pipe when ultra-pure water is not used under the pressure difference of 1.090 kg/cm² is calculated as:

$$0.368 \ [m^3/h]$$

Accordingly, the water quantity Q to be supplied to the outward pipe is obtained by the equation (19) as:

$$3.68 \leq Q \leq 5.04 \ [m^3/h] \quad (20)$$

Thus, capacity range of the ultra-pure water supplying system is determined.

(4) To determine the pipe diameter of the outward pipe

The minimum flow velocity of 0.3 m/s must be maintained in the outward pipe. If it is supposed that pipe diameter of the outward pipe is d, it is calculated from the value of minimum water quantity to be supplied to the outward pipe as follows:

$$(\pi \times d^2 \times 3600 \times 0.3)/4 < 3.68$$
$$d < 0.066 \ [m] \quad (21)$$

Because energy loss is lower when pipe diameter is larger, inner diameter of 50 mm is selected from pipe standards.

(5) To determine pipe diameter of the return pipe By the equation (19), the flow rate Q' (m³/s) of the return pipe is:

$$Q' = m \times \pi(d_{u1}/2)^2 V_{u1} + (n - m) \times \pi(d_{u1}/2)^2 V_{u1} - q_n \times m_n \quad (22)$$

Therefore, the water quantity Q' to be supplied to the return pipe is:

$$2.54 \leq Q' \leq 3.68 \ [m^3/h] \quad (23)$$

Just as in the case of the outward pipe, it is desirable that minimum flow velocity of 0.6 m/s is maintained in the return pipe. If the pipe diameter of the return pipe is supposed to be d', then $$(\pi \times d^2 \times 3600 \times 0.3)/4 < 2.54$$
$$d' < 0.055 \ [m] \quad (24)$$

Therefore, the inner diameter 50 mm closest to this value is selected from the pipe standards.

(6) To determine the length of the outward pipe To keep the pressure at the confluence point of connection pipe and return pipe at constant level, it is necessary to maintain $\Delta P_1$ and $\Delta P_2$ on the return pipe when $Q'=3.68$ [m³/h] and $Q'=2.54$ [m³/h] at constant values. If the length of the return pipe is $$l \ [m], \quad P_1 = 6.53 \times l \ [kg/m^2]$$
$$P_2 = 3.38 \times l \ [kg/m^2]$$

When control accuracy of pump output is P [kg/m²], $$\Delta P_1 - \Delta P_2 \leq P_{3.15 \times l5P} \quad (25)$$

Accordingly, the length l of the return pipe is determined to satisfy the equation (25).

When the number of user points and the quantity of ultra-pure water to be used at user points are determined by the above procedures of (1)-(6), it is possible to design a piping system, which can supply ultra-pure water without inducing counterflow or intermingling of ultra-pure water contaminated from the return pipe and to determine the capacity of the ultra-pure water producing unit.

In the above embodiment, description has been given on the case where there is one user point to be connected to one connection pipe, whereas there may be two or more user points. In such case, the pipe diameter of connection pipe may be gradually reduced according to the order of the branching points to be arranged from the outward pipe.

It has been described that T-type joint is furnished at the branching point of the outward pipe and the connection pipe and at the confluence point of the connection pipe and the return pipe, whereas it is also effective to provide branching valve without dead space. In this case, this branching valve is normally used in opened state. Usually, ultra-pure water is flowing in the outward pipe and the return pipe without leaving any dead space. If modification or repair is carried out with the branching valve sin closed state on the connection pipe, the outward pipe and the return pipe only when user points are to be modified or repaired, the other user points are not affected. In this way, it is effective to provide branching valves in advance on the outward pipe and the return pipe at the position where the installation increase of ultra-pure water using unit is expected. In so doing, it is possible to connect new ultra-pure water using unit without affecting the other user points. In case such modification, repair and installation increase are carried out, connection is made after inner surface of the pipe is completely cleaned up and dried.

In the above, description has been given to the system, by which ultra-pure water is supplied from final purification unit to a pair of the outward pipe and the return pipe, whereas it is needless to say that the present invention can also be applied to the case where ultra-pure water is supplied through two pairs or more of outward pipe and return pipe.

As the piping materials, macromolecular materials such as vinyl chloride, PVDF (polyvinylidene fluoride resin), PEEK (polyetherether ketone), etc. having smooth circular surface and containing fewer contaminants to be intermingled in ultra-pure water are used. As the piping material having lower elution of contaminants, stainless steel may be used. Such stainless steel is produced by depositing passive state film (particularly, passive state film primarily composed of $Cr_2O_3$) by oxidation in ultra-high purity oxygen at 500° C.-600° C. for 5-10 hours (particularly, oxidation at 550° C. for 9 hours or more) after inner surface is electropolished and completely cleaned up and dried.

Further, the quality of ultra-pure water thus produced can be maintained by removing dust as solid matters or by removing bacteria or by removing ions, silica, organic substances, etc. dissolved in water.

It is possible by the system of the present embodiment to stably supply ultra-pure water of ultra-high purity to user points in a system having many user points. When design of the piping system is changed according to the purpose and application, the same stable supply of ultra-pure water can be provided by controlling the output of pressure pump 503 to have the flow rate and the pressure as desired.

As described above in detail, it is possible according to the piping system for supplying ultra-pure water of this invention to supply ultra-pure water to a plurality of ultra-pure water in constant quantity by the control of pressure pump. On the other hand, it is possible to prevent the decline in purity due to confluence or intermingling of ultra-pure water within the piping system by preventing the counterflow from the outward pipe to the return pipe. Further, the proliferation of microorganisms can be avoided by maintaining minimum flow velocity, and ultra-pure water can be stably supplied to the ultra-pure water using unit through strict selection of piping materials.

By the present invention, it is possible to offer a piping system for supplying ultra-pure water, which can supply ultra-pure water to user points, thus coping with the requirements in an era of semiconductor integrated circuits having 64 MB memory.

What is claimed is:

1. A piping system for supplying ultra-pure water to an ultra-pure water using unit, the piping system comprising:
    a circulation tank for storing primary pure water;
    a pump in fluid communication with said circulation tank for pumping primary pure water from said circulation tank;
    an outward pipe having one end connected to said pump;
    final purifying means for purifying primary pure water supplied by said pump into ultra-pure water, said final purifying means in fluid communication with said outward pipe;
    a connection pipe having an end connected to the other end of said outward pipe;
    a branching pipe connected intermediate the ends of said connection pipe and adapted to be in fluid communication with said ultra-pure water using unit;
    a branching valve disposed in said branching pipe for adjusting a quantity of ultra-pure water supplied to said ultra-pure water using unit;
    a return pipe connected between the other end of said connection pipe and said circulation tank; and
    control means connected to said outward pipe for controlling the output of said pump for maintaining the water pressure in said outward pipe at a constant level;
    wherein the energy loss when the ultra-pure water is passed through said connection pipe upstream of the connection of said branching pipe is equal to the energy loss when ultra-pure water is passed through said connection pipe downstream of the connection with said branching pipe.

2. A piping system for supplying ultra-pure water according to claim 1, wherein said connection pipe has a larger pipe diameter upstream of said branching valve than downstream from said branching valve.

3. A piping system for supplying ultra-pure water according to claim 2, wherein said connection pipe is at least partially contained in said ultra-pure water using unit.

4. A piping system for supplying ultra-pure water according to claim 3, wherein a plurality of branching pipes are connected to said connection pipe.

5. A piping system for supplying ultra-pure water according to claim 1, wherein said branching valve can limit the flow rate of ultra-pure water so that the pressure upstream of said branching valve is higher than the pressure downstream from said branching valve.

6. A piping system for supplying ultra-pure water according to claim 5, wherein a plurality of branching pipes are connected to said connection pipe.

7. A piping system for supplying ultra-pure water according to claim 1, wherein said connection pipe is at least partially contained in said ultra-pure water using unit.

8. A piping system for supplying ultra-pure water according to claim 1, wherein a plurality of branching pipes are connected to said connection pipe.

9. A piping system for supplying ultra-pure water according to claim 8, wherein the pipe diameter of said connection pipe is gradually reduced according to the arrangement order of said branching pipe arranged from said outward pipe to said return pipe.

10. A piping system for supplying ultra-pure water according to claim 1, wherein said outward pipe, said return pipe and said connection pipe are made of one of high purity vinyl chloride resin, vinylidene fluoride resin and polyether-ether ketone.

11. A piping system for supplying ultra-pure water according to claim 1, wherein said outward pipe, said return pipe and said connection pipe are made of stainless steel having an inner surface on which a passive state film made primarily of $Cr_2O_3$ is formed.

* * * * *